United States Patent [19]
Palen

[11] Patent Number: 5,313,965
[45] Date of Patent: May 24, 1994

[54] CONTINUOUS OPERATION SUPERCRITICAL FLUID TREATMENT PROCESS AND SYSTEM

[75] Inventor: Edward J. Palen, Los Angeles, Calif.

[73] Assignee: Hughes Aircraft Company, Los Angeles, Calif.

[21] Appl. No.: 891,138

[22] Filed: Jun. 1, 1992

[51] Int. Cl.$^5$ ............................................. B08B 3/02
[52] U.S. Cl. ........................................ 134/61; 134/71; 134/902; 134/200; 134/113
[58] Field of Search ............ 134/131, 161, 200, 64 R, 134/902, 71, 113

[56] References Cited

U.S. PATENT DOCUMENTS

| | | | |
|---|---|---|---|
| 4,693,777 | 9/1987 | Hazano et al. | 134/902 X |
| 4,838,476 | 6/1989 | Rahn | 134/902 X |
| 4,924,892 | 5/1990 | Kiba et al. | 134/198 |
| 4,960,140 | 10/1990 | Ishijima | 134/200 X |

FOREIGN PATENT DOCUMENTS

| | | | |
|---|---|---|---|
| 62-125619 | 6/1987 | Japan | 134/902 |
| 2-148841 | 6/1990 | Japan | 134/902 |
| 2-304941 | 12/1990 | Japan | 134/902 |

*Primary Examiner*—Frankie L. Stinson
*Attorney, Agent, or Firm*—M. E. Lachman; M. W. Sales; W. K. Denson-Low

[57] ABSTRACT

A system for continuously processing items using supercritical fluid wherein the main process vessel in which the items are cleaned or extracted is continuously pressurized with supercritical fluid. The continuous pressurization of the main process vessel is achieved by using an entry airlock to initially pressurize the item to be processed prior to transport into the main process vessel. An exit airlock is provided to depressurize the item after cleaning or extraction in the main process vessel. The system also provides for pretreatment of the items in the entry airlock prior to processing in the main vessel. Post-treatment may also be provided in the exit airlock when desired.

7 Claims, 1 Drawing Sheet

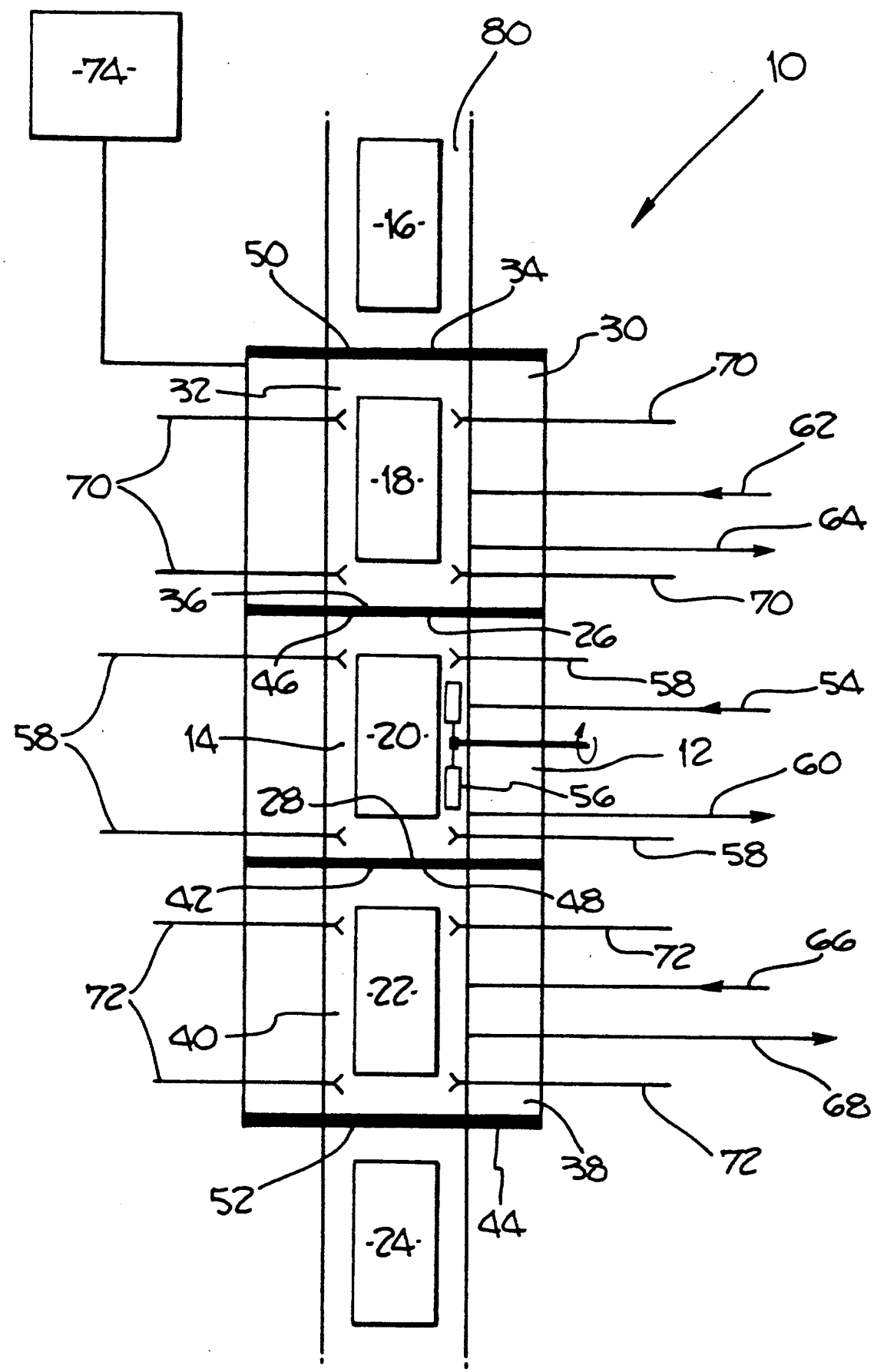

CONTINUOUS OPERATION SUPERCRITICAL FLUID TREATMENT PROCESS AND SYSTEM

BACKGROUND OF THE INVENTION

1. Field of the Invention

The present invention relates generally to the use of supercritical fluids in cleaning or extraction processes. More particularly, the present invention relates to a continuous or semi-continuous process wherein the main cleaning or extraction chamber used in the process is continuously pressurized with supercritical fluid during the cleaning or extraction process.

2. Description of Related Art

Conventional solvent-aided cleaning and extraction processes are currently being re-evaluated due to problems with air pollution and ozone depletion. In addition, recent environmental legislation mandates that many of the organic solvents used in these processes be banned or their use severely limited. The use of supercritical fluids for cleaning or extracting a wide variety of materials has been under investigation as an alternative to the above-mentioned solvent based processes. A supercritical fluid is a dense phase gas which has been compressed to either supercritical or subcritical conditions to achieve liquid-like densities. Unlike organic solvents, such as hexane or 1,1,1-trichloroethane, supercritical fluids exhibit unique physical properties such as low surface tension, low viscosity, high diffusivity, and variable solute carrying capacity.

The solvent properties of compressed gases are well known, as discussed in U.S. Pat. No. 5,068,040, assigned to the present assignee. In the late 1800's, Hannay and Hogarth found that inorganic salts could be dissolved in supercritical ethanol and ether (J. B. Hannay and H. Hogarth, *J. Proc. Roy. Soc.* (London), 29, p. 324, 1897). By the early 1900's, Buchner discovered that the solubility of organics such as naphthalene and phenols in supercritical carbon dioxide increased with pressure (E. A. Buchner, *Z. Physik Chem.*, 54, p. 665, 1906). Within forty years Francis had established a large solubility database for liquified carbon dioxide which showed that many organic compounds were completely miscible. (A. W. Francis, *J. Phys. Chem.*, 58, p. 1099, 1954).

In the 1960's there was much research and use of dense phase gases in the area of chromatography. Supercritical fluids (SCF) were used as the mobile phase in separating non volatile chemicals (S. R. Springston and M. Novotny, "Kinetic Optimization of Capillary Supercritical Chromatography using Carbon Dioxide as the Mobile Phase", *CHROMATOGRAPHIA*, Vol. 14, No. 12, p. 679, December 1981). Today the environmental risks and costs associated with conventional solvent aided separation processes require industry to develop safer and more cost-effective alternatives. The volume of current literature on solvent-aided separation processes using dense carbon dioxide as a solvent is evidence of the extent of industrial research and development in the field. Documented industrial applications utilizing dense fluids include extraction of oil from soybeans (J. P. Friedrich and G. R. List and A. J. Heakin, "Petroleum Free Extracts of Oil from Soybeans", *JAOCS*, Vol. 59, No. 7, July 1982), decaffination of coffee (C. Grimmett, *Chem. Ind.*, Vol. 6, p. 228, 1981), extraction of pyridines from coal (T. G. Squires, et al., "Super-critical Solvents. Carbon Dioxide Extraction of Retained Pyridine from Pyridine Extracts of Coal", *FUEL*, Vol. 61, November 1982), extraction of flavorants from hops (R. Vollbrecht, "Extraction of Hops with Supercritical Carbon Dioxide", *Chemistry and Industry*, 19 Jun. 1982), and regenerating absorbents (activated carbon) (M. Modell, "Process for Regenerating Absorbents with Supercritical Fluids", U.S. Pat. No. 4,124,528, Nov. 7, 1978).

Examples of processes utilizing supercritical fluids are described in U.S. Pat. Nos. 5,013,366 and 5,068,044 which issued on May 7, 1991 and Nov. 26, 1991 respectively, and are assigned to the present assignee. The contents of these two patents is hereby incorporated by reference. The processes described in the two patents are typical of accepted batch type processing wherein the substrate, sample or other material to be processed is loaded into a processing vessel which is unpressurized. The vessel is subsequently sealed and then pressurized with supercritical fluid. After completion of the cleaning or extraction process, the vessel is depressurized and opened for sample unloading. While useful for precision cleaning of various substrates, this type of batch processing is labor intensive and requires long pressurization and depressurization times. In addition, the pressurization vessels used in batch-type processes must be relatively large in order to achieve even moderate volumetric throughput. These large pressurization vessels are expensive.

It would be desirable to provide a supercritical fluid processing system which is more efficient, quicker and less labor intensive than the above-described batch-type processes. Further, it would be desirable to decrease the size of the pressurization vessel in order to decrease the cost and improve the efficiency of supercritical fluid processing where large volumetric throughput is required.

SUMMARY OF THE INVENTION

In accordance with the present invention, a system and process are provided which do away with many of the drawbacks of batch-type processing. The present invention is based upon a system and process for continuously processing items using supercritical fluid. The system includes a main processing vessel which has walls defining a supercritical fluid cleaning zone. The main processing vessel includes an inlet through which the items are introduced into the supercritical fluid processing zone and an outlet through which the items are removed.

In accordance with the present invention, an entry airlock and an exit airlock are connected to the main process vessel at the vessel inlet and outlet, respectively. The main process vessel, entry airlock and exit airlock are separated by airlock seals which may be selectively operated between open and closed positions. By appropriate operation of the various airlock seals, the main process vessel is continuously pressurized with supercritical fluid during the sequential delivery of items into the processing zone. The entry airlock is pressurized after the item to be processed has been loaded therein. Once pressurized, the airlock seal is opened to allow transport of the item into the continuously pressurized process vessel. After processing in the main process vessel, the item is transported into the exit airlock which has been pressurized. The exit airlock is then depressurized and the item is removed from the system.

The items are transported through the system by a mechanical device which is designed to transport items sequentially through the entry airlock, main process vessel and exit airlock. As a feature of the present invention, the transport mechanism is automated and synchronized with the operation of the various airlock seals to allow transport of the items through the system without requiring depressurization of the main process vessel.

As a feature of the present invention, the continuous pressurization of the main process vessel with supercritical fluid eliminates the time-consuming and inefficient prior batch-type operations wherein the main process vessel is repeatedly pressurized and depressurized for each item or batch of items being processed.

The system and process of the present invention are especially well-suited for commercial scale supercritical fluid processing operations. The process vessel is always kept pressurized at supercritical fluid conditions, and the entry airlock and exit airlock are continually pressurized and depressurized as the items to be processed are continually fed into and out of the system. As a feature of the present invention, the item may be pretreated in the entry airlock with surfactants and other chemicals designed to enhance the removal efficiency of the supercritical fluid cleaning step in the main processing vessel. In addition, a gas sprayer may be used in the entry airlock to help remove particulates and other gross contaminants from the item or material to be cleaned.

As a further feature of the present invention, a certain amount of supercritical fluid cleaning or extraction takes place in the entry airlock and exit airlock. Accordingly, the amount of time required for processing of the item in the main process vessel is reduced.

The above-discussed and many other features and attendant advantages of the present invention will become better understood by reference to the following detailed description when taken in conjunction with the accompanying drawing.

BRIEF DESCRIPTION OF THE DRAWING

The drawing is a schematic representation of a preferred exemplary continuous supercritical fluid processing system in accordance with the present invention.

DESCRIPTION OF THE PREFERRED EMBODIMENTS

The supercritical or dense phase fluids which may be used in accordance with the present invention include any of the known gases which may be converted to supercritical fluids or liquefied at temperatures and pressures which will not degrade the physical or chemical properties of the substrate being cleaned. These gases typically include, but are not limited to: (1) hydrocarbons, such as methane, ethane, propane, butane, pentane, hexane, ethylene, and propylene; (2) halogenated hydrocarbons such as tetrafluoromethane and chlorodifluoropropane; (3) inorganics such as carbon dioxide, ammonia, helium, krypton, argon and nitrous oxide; and (4) mixtures thereof. The terms "dense phase gas" or "supercritical fluid" as used herein are intended to include mixtures of such dense phase gases.

The dense phase gas selected to remove a particular contaminant is chosen to have a solubility chemistry which is similar to that of the targeted contaminant. For example, if hydrogen bonding makes a significant contribution to the internal cohesive energy content, or stability, of a contaminant, the chosen dense phase gas must possess at least moderate hydrogen bonding ability in order for solvation to occur. In some cases, a mixture of two or more dense phase gases may be formulated in order to have the desired solvent properties. The selected dense phase gas must also be compatible with the substrate being cleaned, and preferably has a low cost and high health and safety ratings.

Carbon dioxide is a preferred dense phase gas for use in practicing the present invention since it is inexpensive and non-toxic. The critical temperature of carbon dioxide is 304° Kelvin (31.1° C.) and the critical pressure is 72.8 atmospheres ($73.7 \times 10^5$ pascals or Newtons/meter$^2$).

A preferred exemplary system in accordance with the present invention is shown diagrammatically in the figure. The system is designed to provide continuous or semi-continuous processing of items using supercritical fluids. The term "supercritical fluid processing" as used herein is intended to include cleaning, extraction and any other process wherein items, such as complex hardware or various substrates are treated with supercritical fluid.

The system in accordance with the present invention is shown generally at 10. The system includes a main process vessel 12, which includes walls which define a supercritical fluid processing zone 14 into which items such as those shown at 16, 18, 20, 22 and 24 are introduced for processing. The main process vessel 12 includes an inlet 26 through which the items are introduced into the supercritical fluid processing zone 14 and an outlet 28 through which the items are removed from the supercritical fluid processing zone 14 after processing. The supercritical fluid processing zone 14 has a size and volume as required to process the selected items in a predetermined amount of time. Since the cost of pressurization vessels increases significantly with increased size, it is often desirable to minimize such costs by reducing the size of the pressurization vessel. In the latter case, the supercritical fluid processing zone 14 preferably will range in size up to about 6 to 8 inches (15.2 to 20.3 cm) in diameter with a volume capacity of up to about 60 liters.

In accordance with the present invention, the items to be cleaned are first loaded onto transport device 80 and passed into an entry airlock 30. The entry airlock includes walls which define an entry airlock zone 32. The entry airlock includes an inlet 34 and an outlet 36. The outlet 36 of the entry airlock is connected to the inlet 26 of the main process vessel 12.

An exit airlock 38 is provided which has walls defining an exit airlock zone 40 into which the items are passed after processing in the main process vessel 12. The exit airlock 38 includes an inlet 42 which is connected to the outlet 28 of the main process vessel 12 and an outlet 44 through which the items are passed after complete treatment in the system.

In accordance with the present invention, means are provided for selectively sealing the entry airlock inlet or outlet, the main process vessel inlet or outlet and the exit airlock inlet or outlet. Preferably, the entry airlock 30 and exit airlock 38 are connected directly to the main process vessel 12 so that a single airlock seal represented at 46 and 48 are required. The airlock seals 46 and 48 at the entry airlock outlet 36 and the exit airlock inlet 42 can be any of the known airlock seal systems which are designed to be operable between open and closed positions for selectively sealing the main processing vessel 12 from the entry airlock 30 and the exit airlock 38. The particular sealing system used will depend upon the size of the inlet into the supercritical fluid process zone 14. Such seal assemblies are well known in the art of airlocks. Any suitable airlock seal assembly may be used provided that it is capable of providing seals at pressures of up to 10,000 psi ($6.896 \times 10^7$ pascals). Pressures on the order of 2000 to 3000 psi ($1.38 \times 10^7$ to $2.07 \times 10^7$ pascals).

In addition to airlock seals 46 and 48 located at the inlet and outlet of the main process vessel 12, the system also includes an airlock seal 50 at the inlet 34 of the entry airlock 30 and an airlock seal 52 at the outlet 44 of the exit airlock 38.

As a basic feature of the present invention, the supercritical fluid process zone 14 is maintained under pressure continuously by appropriate control of the airlock seals 46, 48, 50 and 52. During operation, supercritical fluid is passed into the supercritical fluid process zone via line 54. A mechanical stirrer 56 or other means for circulating supercritical fluid within process zone 14 are preferably provided to enhance interaction of the supercritical fluid with the item 20 during cleaning or extraction. In addition to mechanical agitation of the supercritical fluid, other types of agitation are contemplated including the use of ultrasound or other wave-based circulation systems. Gas or liquid sprayers 58 are provided both to remove particulates from the surface of the item being cleaned and to circulate the supercritical fluid.

The contaminated supercritical fluid which is generated during processing in the supercritical fluid process zone 14 is removed via line 60 for processing in a conventional separator or recovery unit (not shown) and recycling back to the main process vessel 12 through line 54.

Prior to entry into the main process vessel 12, the items are first placed within the entry airlock 30. Once inside the entry airlock 30, the airlock seal 50 is closed and the entry airlock zone 32 is pressurized with fluid which is introduced through line 62. Once the entry airlock zone 32 has been pressurized, the airlock seal 46 between the main processing vessel and entry airlock 30 is opened to allow transport of the item from the entry airlock 30 into the main process vessel 12 without depressurizing the main process vessel 12. After the item has been transported into the main processing vessel 12 from the entry airlock 30, the airlock seal 46 is closed and the entry airlock 30 is depressurized by removal of supercritical fluid through line 64. Upon depressurization of the entry airlock 30, the airlock seal 50 is opened so that the next specimen may be transported into the entry airlock 30.

Like the entry airlock 30, the exit airlock 38 must be pressurized with supercritical fluid before the airlock seal 48 between the main process vessel 12 and the exit airlock 38 can be opened. Fluid is introduced into the exit airlock zone 40 via pressurized gas line 66. After sufficient supercritical fluid has been introduced into the exit airlock zone 40 to pressurize the exit airlock 38, the airlock seal 48 is opened to allow transport of the item from the main process vessel 12 to the exit airlock 38. The airlock seal 48 is then closed and the exit airlock 38 is depressurized by removal of supercritical fluid through outgas line 68. Once the exit airlock 38 is depressurized, the airlock seal 52 is then opened so that the item may be removed from the system. The exit airlock 38 is then pressurized with airlock seals 48 and 52 closed, to receive the next item from the main process vessel 12.

The mechanical device or transport means which moves the items or materials through the entry airlock 30, main process vessel 12 and exit airlock 38 is shown schematically as 80 in the figure. The transport device 80 can be any of the known automated transport systems for sequentially transporting items through various treatment chambers. The transport device 80 may include chains, levers, rails, springs, pulleys and other well known mechanical elements used in such systems provided that no lubricants that can be removed by the supercritical fluid are present in the system within the entry airlock 30, main process vessel 12 or exit airlock 38. Since the supercritical fluid will dissolve and remove some conventional lubricants, the presence of such lubricants within the main process vessel and airlocks is undesirable. Optionally, gas bearings, such as air bearings, may be used as the lubricant.

The operational steps of this preferred exemplary embodiment are set forth in the following table where the operation of the system is broken down into four basic steps. During continuous operation of the system, steps 1–4, as set forth in the table, are repeated continually. The amount of time that the items to be processed are allowed to remain in the entry airlock, main processing vessel, and exit airlock may be readily determined using methods known in supercritical fluid treatment processes. Optionally, monitor means may be provided in one or all of the main processing vessel, entry airlock and exit airlock to determine the amount of cleaning or extraction which has been achieved or the extent to which the treatment with the supercritical fluid has been completed.

| OPERATION STEPS OF CONTINUOUS SUPERCRITICAL FLUID PROCESSING SYSTEM | | | | | | | |
|---|---|---|---|---|---|---|---|
| OPERATION STEP NUMBER | HIGH PRESSURE AIRLOCK SEAL | | | | ENTRY AIRLOCK | MAIN PROCESSING | EXIT AIRLOCK (38) |
| | (50) | (46) | (48) | (52) | (30) | VESSEL (12) | |
| #1 | open | closed | closed | closed | Load container* from loading train. | Container is being cleaned.* Cleaning finished. | Pressurize empty airlock with supercritical fluid. |
| #2 | closed | closed | open | closed | Pretreat material and spray treat material to be cleaned. Pressurize with supercritical fluid. | Unload container to outlet airlock. Close seal (48) before opening seal (46). | Receive container in main processing vessel |
| #3 | closed | open | closed | closed | Unload | Receive | Spray treat mater- |

| OPERATION STEP NUMBER | HIGH PRESSURE AIRLOCK SEAL | | | | ENTRY AIRLOCK (30) | MAIN PROCESSING VESSEL (12) | EXIT AIRLOCK (38) |
|---|---|---|---|---|---|---|---|
| | (50) | (46) | (48) | (52) | | | |
| | | | | | container to main processing vessel. | container from inlet airlock. Close seal (46). | ial and depressurize airlock, sending outgas to separator unit. When airlock pressure is reduced to atmospheric pressure, open seal (52). |
| #4 | closed | closed | closed | open | Depressurize empty airlock, sending outgas to separator. When airlock pressure is atmospheric, open seal (50). | Container is being cleaned. Recirculate supercritical fluid from supply to separator unit. | Unload cleaned container to unloading train. |

*Container holds material to be cleaned, extracted or processed.

As described in the table, the items or material to be processed may be pretreated or precleaned in the entry airlock 30. Gas or liquid sprayers 70 are provided for introducing pretreatment fluids or gases, such as co-solvents, surfactants, emulsifiers, inert gas, supercritical fluids, or mixtures thereof. In addition to pretreatment in entry airlock 30, the items may be precleaned to remove gross contaminants. When precleaning is desired, various fluids may be introduced through the sprayers 70 to achieve the desired removal of gross contaminants either by the chemical action of solvents or by the inertial action of the gas or liquid spray. In addition, a certain amount of initial cleaning occurs in the entry airlock 30 during pressurization with supercritical fluid prior to opening of the airlock 46.

If desired, the processed items may be post-treated in the exit airlock 38 with a variety of liquids or gases which are introduced through sprayers 72. The post-treatment of the items can include treatment with gases to remove any particulates still on the surface of the item being cleaned, treatment with coating agents or surface treatment liquids, or other treatment of the cleaned surface of the item.

A control unit 74 is provided for controlling and coordinating the airlock seals and pressurization of the airlocks so that the main process vessel 12 is continuously pressurized with supercritical fluid and airlock seals 46 and 48 are only opened when their respective entry or exit airlocks are appropriately pressurized with supercritical fluid to allow transport of the items to be processed into and out of the main processing vessel without loss of pressurization therein. Typically, such a control unit comprises a computer.

The continuous pressurization system described above provides a number of advantages over batch type systems where the main process vessel must be pressurized and depressurized for each item or batch of items being processed. For example, the system of the present invention decreases the processing time per unit and increases the volume of material which can be processed through a process vessel of given volumetric capacity. As a result, the volume of the main process vessel in accordance with the present invention may be reduced while maintaining the same process volumetric throughput as prior batch-type processes. Smaller pressure vessels are less expensive per unit volume of vessel and would represent a significant economic savings as well as adding flexibility to possible uses for the system. For example, the reduction in size of pressure vessels would allow for the system to be made into a mobile unit. The whole unit, with all auxiliary pieces could be fit onto a large truck and transported to various different cites for cleaning, extraction or processing of a wide variety materials. This transportability is particularly desirable when treating hazardous chemicals, such as in the remediation of contaminated soils, or when extracting toxic compounds absorbed by activated carbon to regenerate the carbon.

The system of the present invention is well-suited for fully automated operation which represents significant labor savings over the labor intensive operation of batch loading and unloading of the main process vessel. In addition, the system and process in accordance with the present invention inherently allow one to conduct pretreatment and post-treatment operations on the items as they are initially pressurized in the entry airlock and as they are depressurized in the exit airlock.

Having thus described exemplary embodiments of the present invention, it should be noted by those skilled in the art that the within disclosures are exemplary only and that various other alternatives, adaptations and modifications may be made within the scope of the present invention. Thus, by way of example and not of limitation, if desired, multiple entry and exit airlocks may be connected to a single main process vessel to allow multiple and independent introduction of items into the main processing vessel. Alternatively, multiple main process vessels may be connected to a single entry airlock and exit airlock system wherein different items within the entry airlock are directed to different processing vessels, and exit the various processing vessels into a single exit airlock after processing has been completed. In this way, a variety of different supercritical fluids may be simultaneously used to treat different items for different lengths of time. Accordingly, the present invention is not limited to the specific embodiments as illustrated herein but is only limited by the following claims.

What is claimed is:

1. A system for continuously processing items using supercritical fluid comprising:

a main process vessel comprising walls defining a supercritical fluid processing zone, said main process vessel further comprising an inlet through which said items are introduced into said supercritical fluid processing zone and an outlet through which said items are removed from said supercritial fluid processing zone;

an entry airlock comprising walls defining an entry airlock zone, said entry airlock further comprising an inlet through which said items are introduced into said entry airlock zone and an outlet connected to said main process vessel inlet through which said items are passed from said entry airlock zone to said supercritical fluid processing zone;

an exit airlock comprising walls defining an exit airlock zone, said exit airlock further comprising an inlet connected to said main process vessel outlet through which said items are passed from said supercritical fluid processing zone to said exit airlock, and an outlet through which said items are removed from said exit airlock;

main process vessel seal means operable between open and closed positions for selectively sealing said inlet or outlet of said main process vessel;

entry airlock seal means operable between open and closed positions for selectively sealing said inlet or outlet of said entry airlock;

exit airlock seal means operable between open and closed positions for selectively sealing said inlet or outlet of said exit airlock;

main process vessel pressure means for continuously pressurizing said supercritical fluid processing zone with supercritical fluid;

entry airlock pressure means for selectively pressurizing said entry airlock zone with supercritical fluid when said inlet and outlet of said entry airlock are sealed;

means for monitoring the extent to which said item has been processed with supercritical fluid in said entry airlock;

exit airlock pressure means for selectively pressurizing said exit airlock with supercritical fluid when said inlet and outlet of said exit airlock are sealed;

transport means for moving said items through said entry airlock zone, said main process vessel and said exit airlock zone; and means for controlling the operation of said main process vessel seal means, said entry airlock seal means, said exit airlock seal means, said entry airlock pressure means and said exit airlock pressure means to provide transport of said items through said entry airlock, main process vessel and exit airlock without depressurizing said supercritical fluid processing zone.

2. A system for continuously processing items using supercritical fluid according to claim 1 wherein said main process vessel seal means for sealing the inlet of said main process vessel and the entry airlock seal means for sealing the outlet of said entry airlock is provided by a single seal.

3. A system for continuously processing items using supercritical fluid according to claim 1 wherein said main process vessel seal means for sealing the outlet of said main process vessel and the exit airlock means for sealing the inlet of said exit airlock is provided by a single seal.

4. A system for continuously processing items using supercritical fluid according to claim 1 wherein said system further includes means for pre-treating or pre-cleaning said item in said entry airlock zone.

5. A system for continuously processing items using supercritical fluid according to claim 1 wherein said system further includes means for post-treating or post-cleaning said item in said exit airlock zone.

6. A system for continuously processing items using supercritical fluid according to claim 1 wherein said system further includes fluid flow means for circulating supercritical fluid within said processing zone.

7. A system for continuously processing items using supercritical fluid according to claim 1 wherein said system further comprises monitor means connected to said main process vessel for determining the extent to which said processing of said items with said supercritical fluid has been completed.

* * * * *